(12) United States Patent
Tinari (10) Patent No.: US 11,213,973 B2
(45) Date of Patent: Jan. 4, 2022

(54) SYSTEMS AND METHODS FOR RAPIDLY PRODUCING CONCRETE STRUCTURES

(71) Applicant: TINARI 3D Inc., Coquitlam (CA)

(72) Inventor: Paul D. Tinari, Vancouver (CA)

(73) Assignee: TINARI 3D INC., Coquitlam (CA)

( * ) Notice: Subject to any disclaimer, the term of this patent is extended or adjusted under 35 U.S.C. 154(b) by 413 days.

(21) Appl. No.: 16/155,738

(22) Filed: Oct. 9, 2018

(65) Prior Publication Data

US 2019/0105834 A1 Apr. 11, 2019

Related U.S. Application Data

(60) Provisional application No. 62/570,023, filed on Oct. 9, 2017.

(51) Int. Cl.

| B28B 1/00 | (2006.01) |
|---|---|
| B29C 64/227 | (2017.01) |
| B29C 64/106 | (2017.01) |
| B29C 64/209 | (2017.01) |
| B64C 39/02 | (2006.01) |
| B33Y 30/00 | (2015.01) |
| B33Y 40/00 | (2020.01) |
| B29C 64/30 | (2017.01) |
| E04G 21/04 | (2006.01) |

(52) U.S. Cl.
CPC ............ *B28B 1/001* (2013.01); *B29C 64/106* (2017.08); *B29C 64/209* (2017.08); *B29C 64/227* (2017.08); *B29C 64/30* (2017.08); *B33Y 30/00* (2014.12); *B33Y 40/00* (2014.12); *B64C 39/024* (2013.01); *E04G 21/04* (2013.01); *B64C 2201/12* (2013.01)

(58) Field of Classification Search
CPC ...................................................... B28B 1/001
See application file for complete search history.

(56) References Cited

U.S. PATENT DOCUMENTS

| 4,625,938 | A | * | 12/1986 | Brown | F16M 11/18 |
|---|---|---|---|---|---|
| | | | | | 248/550 |
| 5,313,854 | A | * | 5/1994 | Akeel | B23Q 1/5462 |
| | | | | | 212/239 |
| 5,440,476 | A | * | 8/1995 | Lefkowitz | G05B 19/251 |
| | | | | | 212/76 |
| 8,070,134 | B1 | * | 12/2011 | Bellantoni | B66D 1/26 |
| | | | | | 254/337 |
| 9,777,491 | B2 | * | 10/2017 | Grivetti | E04G 21/04 |

(Continued)

FOREIGN PATENT DOCUMENTS

WO    WO-2016097498 A1 *   6/2016   ............... E04B 1/35

*Primary Examiner* — Timothy Kennedy
(74) *Attorney, Agent, or Firm* — Davis Wright Tremaine LLP; Heather M. Colburn (57) ABSTRACT

A three-dimensional printing system that includes a nozzle and means for positioning the nozzle. The nozzle is configured to dispense a concrete mix. The means for positioning the nozzle may include cable and control systems. The cable system includes positioning cables that are connected to the nozzle. The control system includes control modules each connected to a different corresponding one of the positioning cables. Each of the control modules controls a distance that the corresponding positioning cable positions the nozzle from the control module. Alternatively, the means for positioning the nozzle may include first and second flying drones.

20 Claims, 7 Drawing Sheets

(56) References Cited

U.S. PATENT DOCUMENTS

| | | | |
|---|---|---|---|
| 2005/0024005 A1* | 2/2005 | Rodnunsky | F16M 11/043 318/649 |
| 2009/0066100 A1* | 3/2009 | Bosscher | B25J 17/0266 294/86.4 |
| 2010/0207288 A1* | 8/2010 | Dini | E04B 1/3505 264/33 |
| 2013/0292039 A1* | 11/2013 | Peters | B33Y 30/00 156/168 |
| 2017/0043872 A1* | 2/2017 | Whitaker | B64D 1/18 |
| 2017/0095973 A1* | 4/2017 | Chamberlain | B29C 64/227 |
| 2017/0350115 A1* | 12/2017 | Rocher | B29C 64/236 |
| 2017/0365365 A1* | 12/2017 | White | E04G 21/0463 |
| 2018/0066441 A1* | 3/2018 | Chen-Iun-Tai | B28B 17/0063 |
| 2019/0152051 A1* | 5/2019 | Bramberger | E04B 1/3505 |

* cited by examiner

SYSTEMS AND METHODS FOR RAPIDLY PRODUCING CONCRETE STRUCTURES

CROSS REFERENCE TO RELATED APPLICATION(S)

This application claims the benefit of U.S. Provisional Application No. 62/570,023, filed on Oct. 9, 2017, which is incorporated herein by reference in its entirety.

BACKGROUND OF THE INVENTION

Field of the Invention

The present invention is directed generally three-dimensional printing and more particularly to using three-dimensional printing to produce concrete structures.

Description of the Related Art

Recently, three-dimensional ("3D") printing has advanced and it is now possible to 3D print concrete structures, such as homes. Unfortunately, prior art methods of 3D printing concrete structures have drawbacks. For example, many systems suffer from excessive mechanical complexity and/or are susceptible to jamming (e.g., caused by dirt getting into delicate mechanisms). Other problems include difficulty with field maintainability, a lack of horizontal and vertical construction scalability, excessive weight, and/or difficulty in printing structures on uneven or difficult ground.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
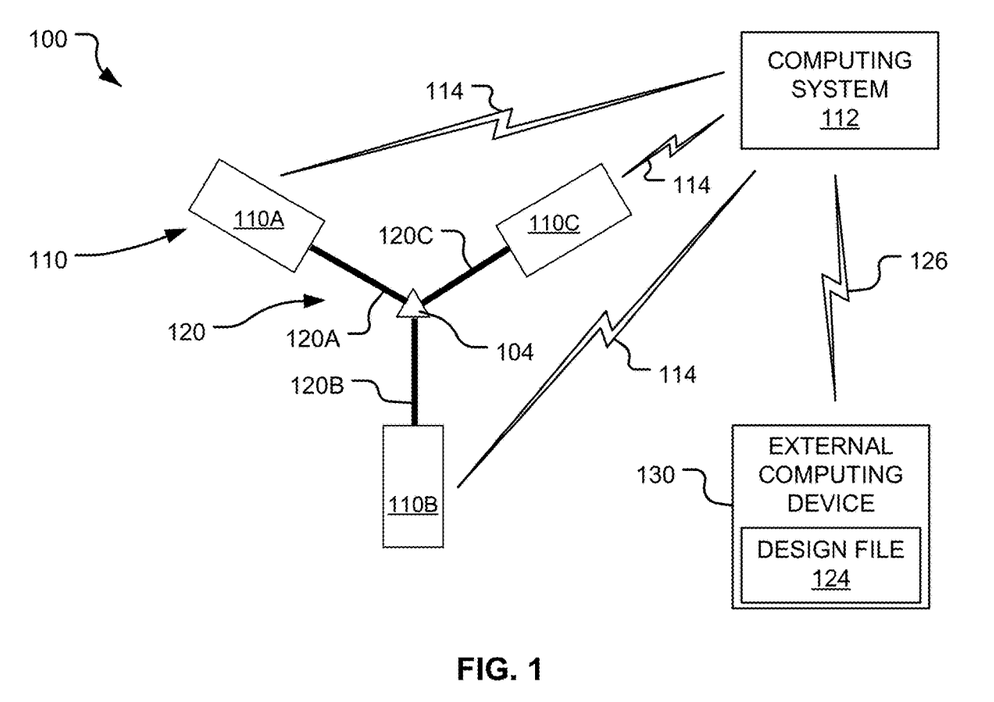
FIG. 1 is an illustration of a three dimensional ("3D") printing system including three positioning cables.

Referring to FIG. 1, this application describes methods of rapidly producing concrete structures that are performed by a three dimensional ("3D") printing system 100. The 3D printing system 100 may be characterized as including three subsystems: a nozzle 104, a control system 110, and a cable system 120. In the embodiment illustrated, the control system 110 includes control modules 110A-110C that each include one or more computer controlled stepper motors and one or more cable control mechanisms housed inside a container (e.g., constructed from metal). The control system 110 may also include at least one computing system 112 connected to each of the control modules 110A-110C by wired or wireless connections 114. The cable system 120 includes a series of positioning cables 120A-120C attached to the nozzle 104.

The cables 120A-120C are attached to the control modules 110A-110C, respectively, which adjust lengths of the cables 120A-120C, respectively, to position the nozzle 104. In other words, the position of the nozzle 104 between the control modules 110A-110C is determined by distances from the control modules 110A-110C at which the cables 120A-120C position the nozzle 104. Thus, the control module 110A controls the distance at which the cable 120A positions the nozzle 104 from the control module 110A, the control module 1106 controls the distance at which the cable 1206 positions the nozzle 104 from the control module 1106, and the control module 110C controls the distance at which the cable 120C positions the nozzle 104 from the control module 110C.

The nozzle 104 is connected to a source 106 (see FIG. 9) of a specially prepared formulation of concrete (referred to as a "concrete mix") by a flexible pipe 102 (see FIGS. 2, 6, 7, and 8). The 3D printing system 100 receives the concrete mix from the source 106 (see FIG. 9) and pumps the received concrete mix through the flexible pipe 102 (see FIGS. 2, 6, 7, and 8) and out of the nozzle 104. The nozzle 104 is accurately positioned in three-dimensional space by any one of a number of methods. For example, the control system 100 may activate the cable system 120, which uses the positioning cables 120A-120C to position the nozzle 104.

Figure 7:
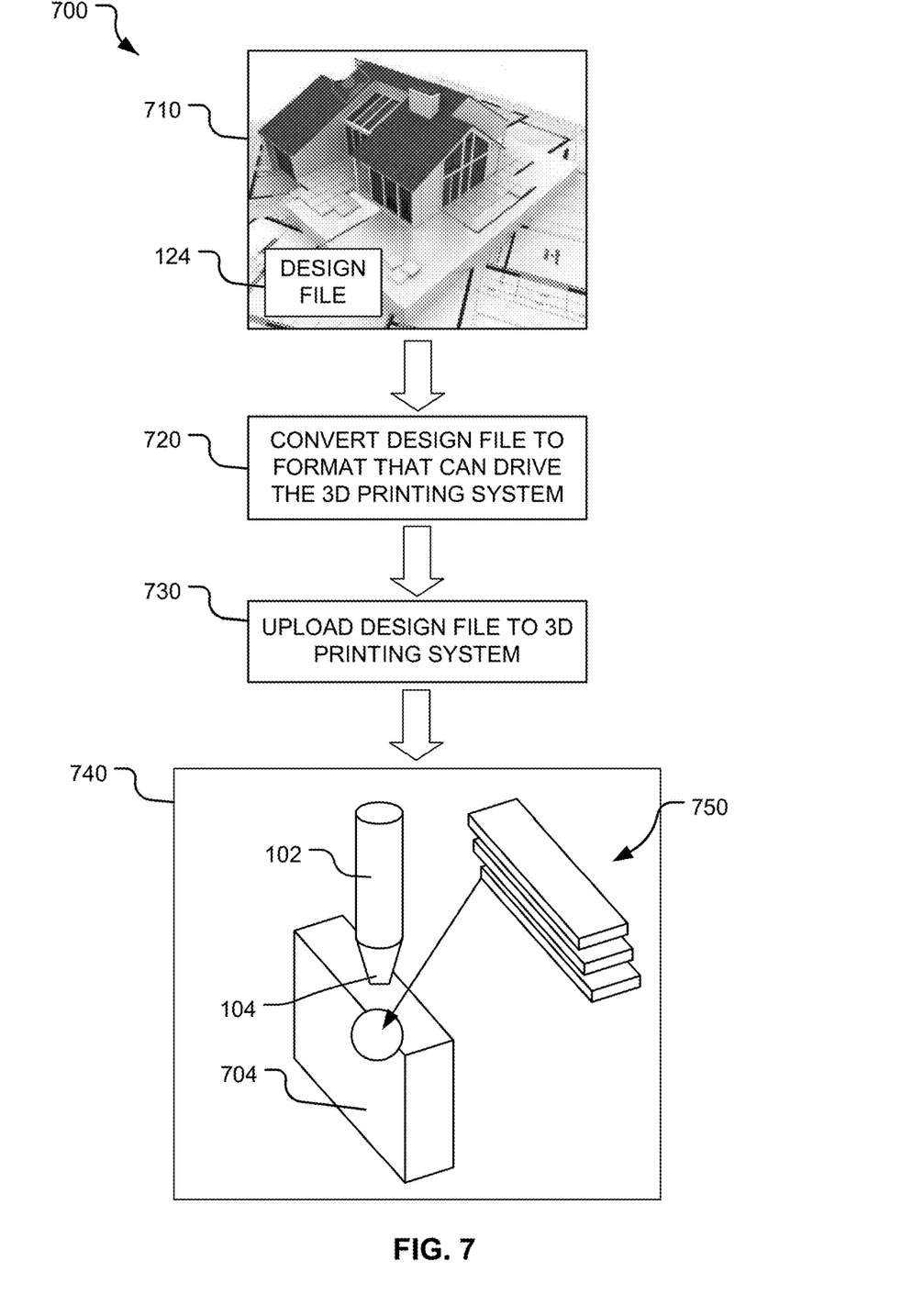
FIG. 7 illustrates a method of using a model, design template, or design file to generate a structure (e.g., a house).

FIG. 7 illustrates a method 700 of using a model, design template, or design file 124 to generate a structure 704 (e.g., a house). At first block 710, a computer aided drawing ("CAD") program (such as Solid Works) is used to create the design file 124 of the structure 704 to be created. In next block 720, the design file 124 may be translated into a format (such as G-Code) that is recognizable by the 3D printing system 100. Referring to FIG. 1, in block 730 (see FIG. 7), the design file 124 may be uploaded (via a wired or wireless connection 126) to the control system 110 (e.g., to the computing system 112) from an external computing device 130. Returning to FIG. 7, in block 740, the (optionally translated) design file 124 may be used by the computing system 112 to accurately position the nozzle 104 as the nozzle 104 dispenses the concrete mix at a steady rate. The nozzle 104 moves and dispenses the concrete mix in successive layers 750 according specifications and/or instructions (e.g., G-Code instructions) included to the design file 124. The method 700 terminates when all of the instructions included in the design file 124 have been executed by the 3D printing system 100.

When the 3D printing system 100 is used to create the structure 704 (e.g., a house), the nozzle 104 is first positioned in a horizontal plane equal to lowest level of the structure 704. Then, the nozzle 104 lays down a continuous ribbon or first layer of the concrete mix that is used to create walls of the structure, according to the uploaded design file 124. After the first layer of the concrete mix has been completed, the control system 110 raises the nozzle 104 by a height of one layer. Then, the nozzle 104 deposits a second layer of the concrete mix directly on top of the first layer. This process is repeated until the entire structure has been completed. The described process and/or the 3D printing system 100 differ from existing technologies in a number of important ways, which include the following:

- Existing systems use mechanical extendable, telescoping, or robotic arms, which limits the size of the structures that they can build. The use of a cable system means that the size of the structure that can be built is virtually unlimited.
- Existing systems are extremely complex mechanically, with hundreds of small parts that are highly sensitive to field conditions, such as dirt and dust contamination. The 3D printing system 100 reduces the number of mechanical parts by 90% and the 3D printing system 100 is field maintainable and able to operate even in areas with heavy dirt and dust.
- The 3D printing system 100 is much lighter in weight than existing designs, so it is more easily transported to remote locations. The entire 3D printing system 100 can be packaged in one large, or three small containers.
- The 3D printing system 100 can be easily set up by two people and is field maintainable.
- The 3D printing system 100 can be used to build any number of structures at the same time, so that, for example, an entire community can be built in a few days.
- The 3D printing system 100 is far less expensive than existing designs and uses off-the-shelf components instead of expensive and hard to source custom-made components.

FIG. 1 shows the geometry of the control system 110 and the cable system 120, which are used to exactly position the centrally placed nozzle 104.

Figure 2:
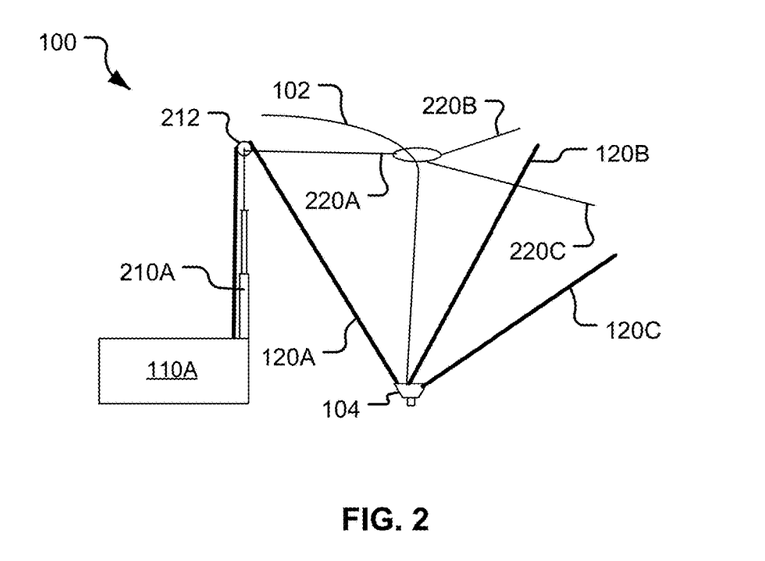
FIG. 2 illustrates an embodiment of the 3D printing system that includes a telescoping tower connected to a control module.
Figure 3:
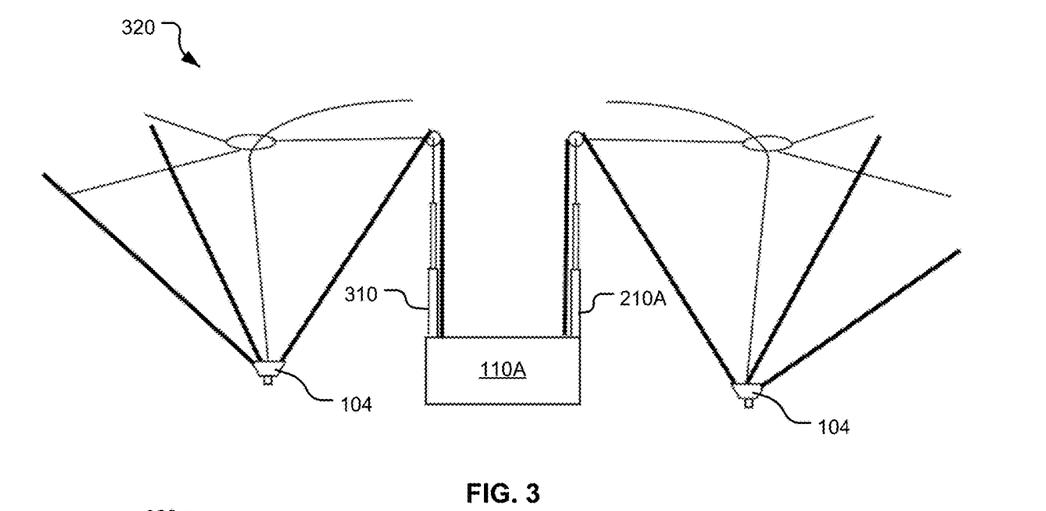
FIG. 3 is a network of 3D printing systems each like the 3D printing system of FIG. 2.
Figure 5:
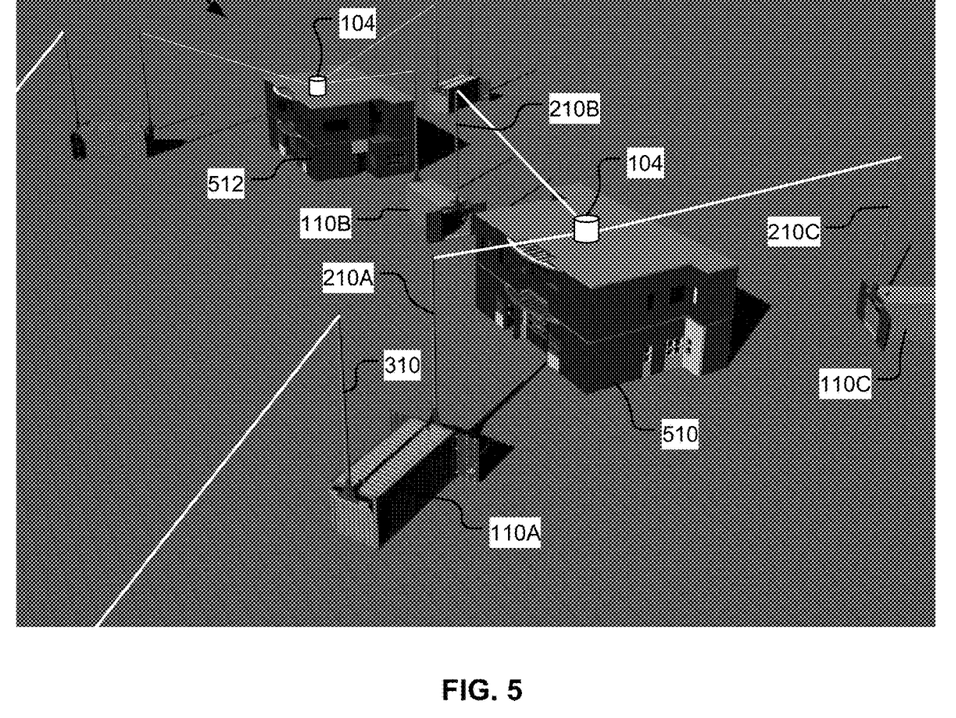
FIG. 5 is a schematic illustrating two structures being built simultaneously by the network of FIG. 3.

FIG. 2 illustrates an embodiment of the 3D printing system 100 that includes a telescoping tower 210A connected to the control module 110A. In the embodiment illustrated, the tower 210A is positioned on top of one end the container of the control module 110A. The tower 210A includes a pulley 212 attached at or near its upper end. The positioning cable 120A extends around the pulley 212. Optionally, a support cable 220A may be attached at or near the upper end of the tower 210A. Referring to FIG. 5, each of the control modules 110B and 110C may be connected to similar towers 210B and 210C, respectively. Referring to FIG. 3, the tower 210B (see FIG. 5) may be connected at or near its upper end to a support cable 220B and a pulley (not shown) through which the positioning cable 120B extends. Similarly, the tower 210C (see FIG. 5) may be connected at or near its upper end to a support cable 220C and a pulley (not shown) through which the positioning cable 120C extends. The support cables 220A-220C may be used to help support the flexible pipe 102 above the nozzle 104.

Figure 6:
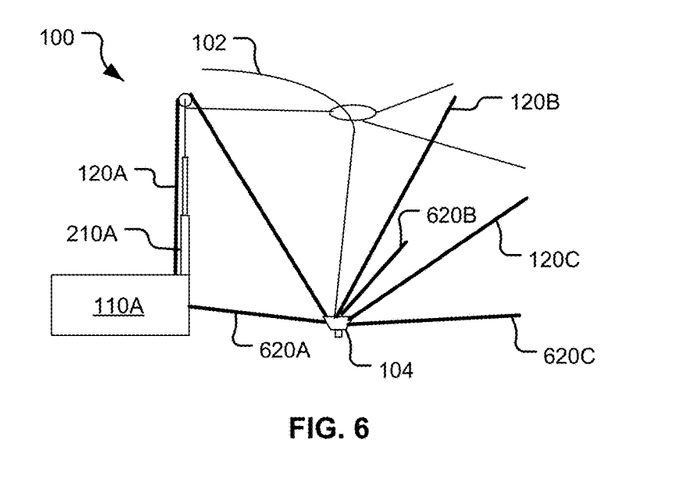
FIG. 6 illustrates an alternate embodiment in which the 3D printing system 100 includes three additional positioning cables for a total of six positioning cables.

As shown in FIG. 3, a significant advantage of the embodiment illustrated in FIG. 2 is that by connecting one or more of the control modules 110A-110C (see FIGS. 1 and 5) to a different second tower 310 (e.g., positioned at the opposite end of each of the containers of the control modules 110A-110C), it is possible to easily set up a network 320 of 3D printing systems each like the 3D printing system 100 (see FIGS. 1, 2, and 6). The network 320 may be configured to build any number of structures, in parallel, at the same time. This approach is ideal in the case when an entire community is destroyed by flood, fire, tornado, or earthquake, and it is desirable to replace all of the housing in the community as quickly as possible.

Figure 4:
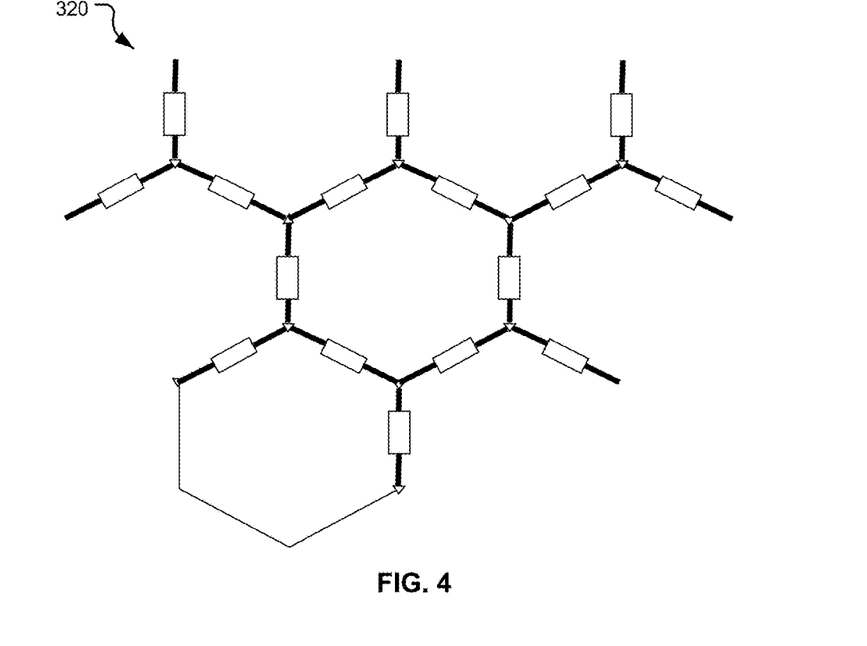
FIG. 4 is a top view of the network of FIG. 3.

FIG. 4 is a top view of the network 320. FIG. 4 illustrates how the network 320 may be interconnected and used to simultaneously build a potentially unlimited number of structures (e.g., homes forming an entire community) in a relatively short amount of time (e.g., in about 24 hours).

FIG. 5 is a schematic illustrating two structures 510 and 512 being built simultaneously by the network 320, which includes an array of towers each like the towers 210A-210C and 310. For clarity, the overhead support cables (e.g., the support cables 220A-220C) that support the concrete dispensing flexible pipe 102 have been omitted from FIG. 5.

Additional Control Cables

Those of ordinary skill in the art will appreciate that instead of using gyroscopic stabilization of the concrete dispensing nozzle 104, other stabilizing mechanisms may be used. For example, FIG. 6 depicts an alternate embodiment in which the 3D printing system 100 includes three additional positioning cables 620A-620C in addition to the original three positioning cables 120A-120C. Referring to FIG. 6, the additional positioning cables 620A-620C may be used to help accurately situate and/or stabilize the nozzle 104 as it is dispensing the concrete mix. Thus, through application of ordinary skill in the art to the present teachings alternate stabilizing mechanisms may be used and all such control mechanisms for positioning the concrete dispensing nozzle 104 are within the scope of the present teachings.

Design of Advanced Large-Scale 3D Concrete Printer

Examples of problems with existing large-scale, 3D concrete printers include the following:
- Excessive mechanical complexity;
- Susceptibility to jamming because of dirt in the delicate mechanisms;
- Difficulty with field maintainability;
- Lack of horizontal and vertical construction scalability;
- Excessive weight; and
- Difficulty in printing structures on uneven or difficult ground.

Figure 8:
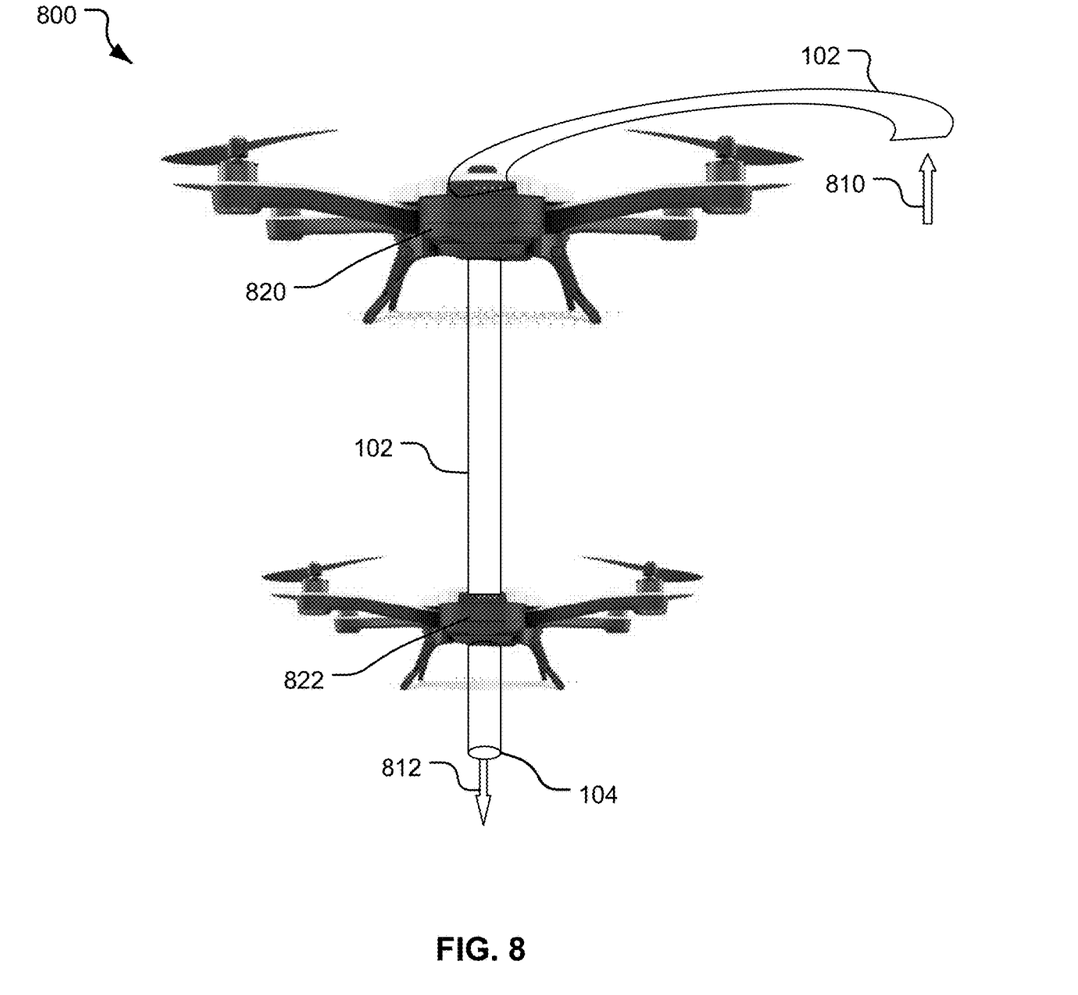
FIG. 8 illustrates an alternate embodiment of a 3D printing system that includes first and second drones.

FIG. 8 illustrates an alternate embodiment of a 3D printing system 800. In FIG. 8, an arrow 810 represents the concrete mix being pumped into the flexible pipe 102 from the source 106 (see FIG. 9) and the arrow 812 represents the concrete mix being deposited by the nozzle 104. The 3D printing system 800 provides a solution to at least some of above problems because the 3D printing system 800 eliminates all of the (complex) supporting structures, whose purpose is to position the 3D printing nozzle in (x, y, z) space. The 3D printing system 800 replaces all of these (complex) supporting structures with a pair of flying drones 820 and 822 (e.g., electric powered drones). By way of a non-limiting example, the first drone 820 may be implemented as a larger, more powerful drone and the second drone 822 may be implemented as a smaller, more maneuverable drone. The first drone 820 holds the main weight of the flexible pipe 102 high above the work site. The second drone 822 positions the nozzle 104 exactly in (x, y, z) space.

Figure 9:
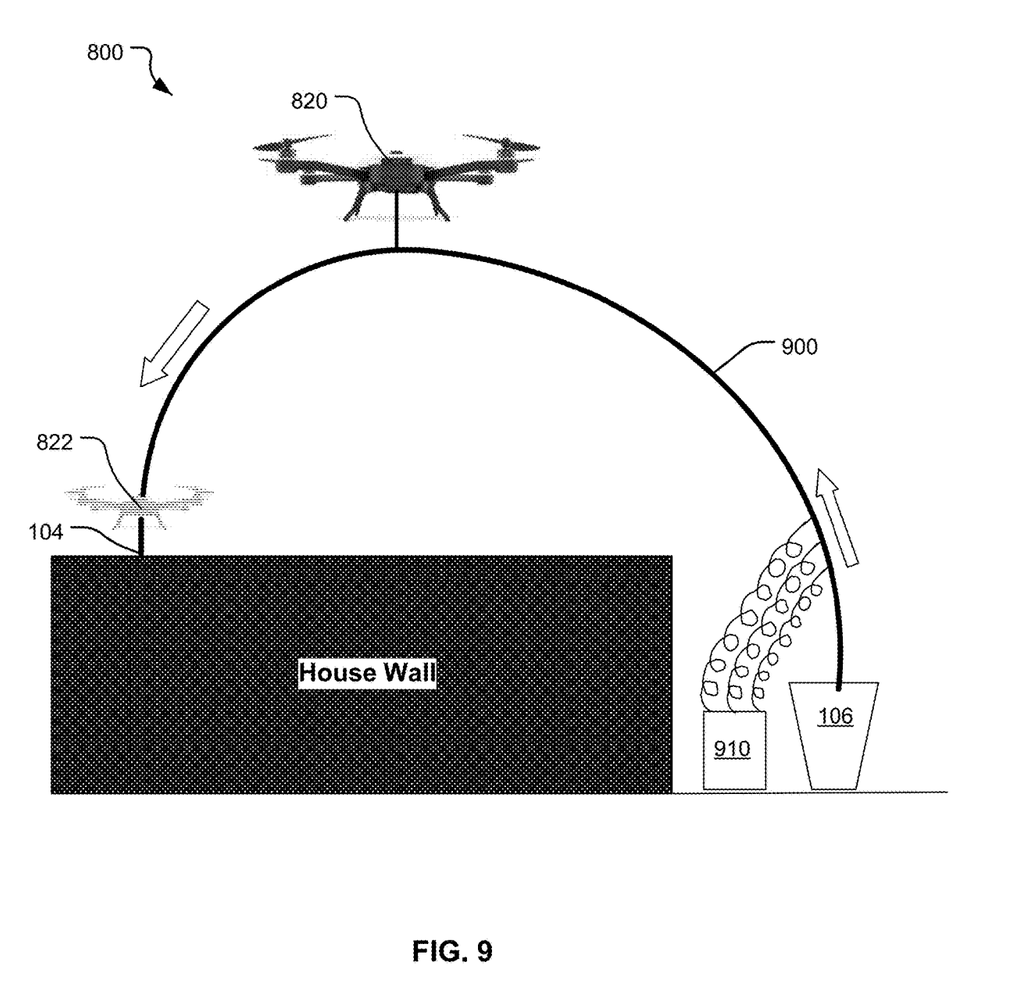
FIG. 9 illustrates an implementation of the 3D printing system of FIG. 8 that includes an electrical supply cable connected to the first and second drones.

FIG. 9 illustrates an implementation of the 3D printing system 800 that includes an electrical supply cable 900 connected to an electrical power source 910 (e.g., a three phase electrical power supply). The flexible pipe 102 (see FIGS. 2, 6, 7, and 8) may be attached to the electrical supply cable 900. The source 106 of the concrete mix is illustrated as being a concrete pumping unit. The electrical supply cable 900 is configured to supply electrical power to the first and second drones 820 and 822, which have been implemented as electric powered drones.

COMPUTING DEVICE

Figure 10:
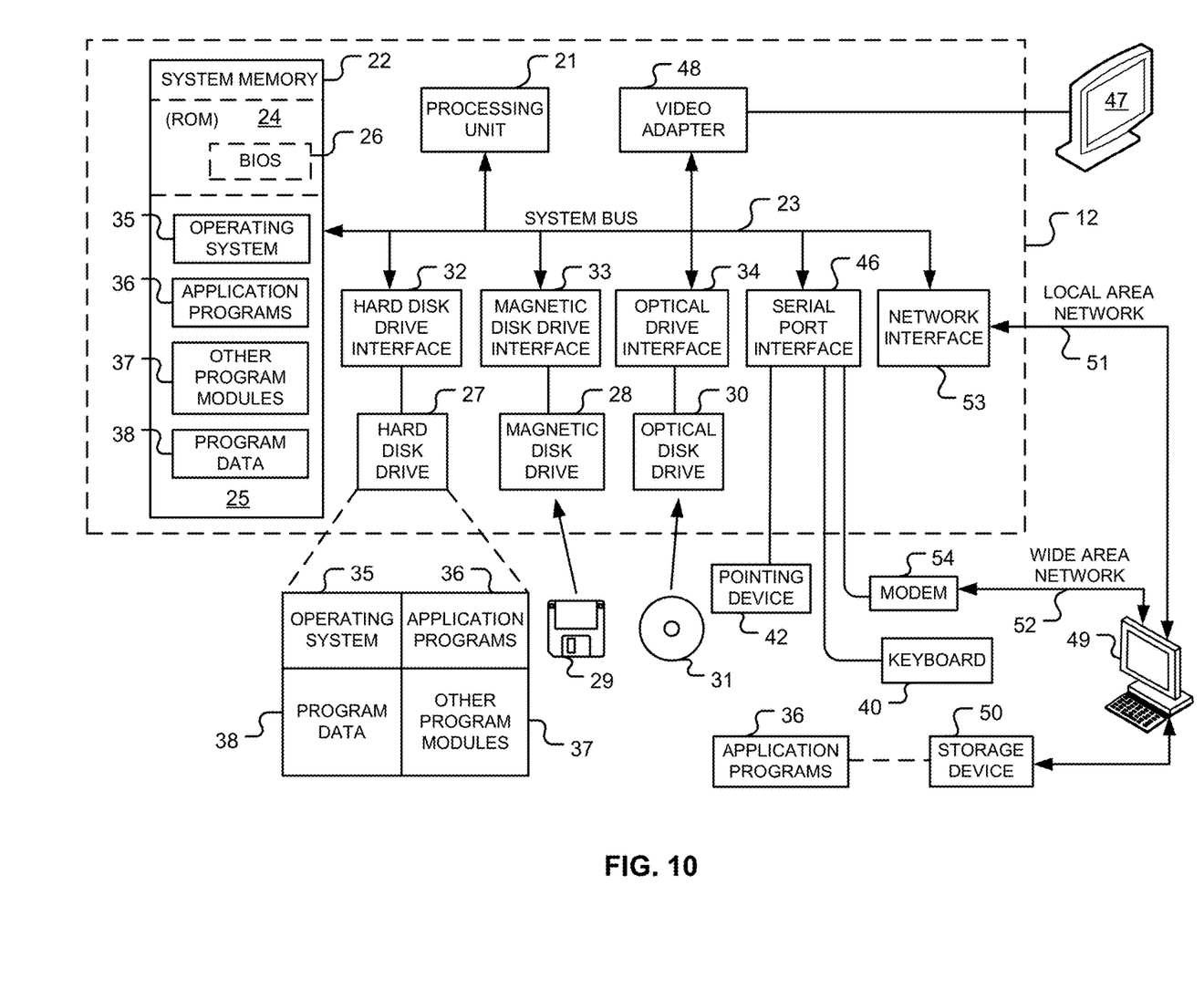
FIG. 10 is a diagram of a hardware environment and an operating environment in which the computing devices of the system of FIG. 1 may be implemented.

FIG. 10 is a diagram of hardware and an operating environment in conjunction with which implementations of the computing system 112 (see FIG. 1) and/or the external computing device 130 (see FIG. 1) may be practiced. The description of FIG. 10 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 10 includes a general-purpose computing device in the form of the computing device 12. The computing system 112 (see FIG. 1) and/or the external computing device 130 (see FIG. 1) may each be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 10 include a local-area network (LAN) 51 and a wide-area network (WAN) 52. Such networking environments are commonplace in offices, enterprise-wide computer networks, intranets and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the method 700 illustrated in FIG. 7) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A three-dimensional printing system comprising:
 a first nozzle configured to dispense a concrete mix;
 a second nozzle;
 a first cable system comprising a plurality of first positioning cables connected to the first nozzle;
 a second cable system comprising a plurality of second positioning cables connected to the second nozzle;
 a control system comprising a plurality of control modules, each of a first portion of the plurality of control modules being connected to a different corresponding one of the plurality of first positioning cables, each of the first portion of the plurality of control modules controlling a first distance that the corresponding first positioning cable positions the first nozzle from the control module, each of a second portion of the plurality of control modules being connected to a different corresponding one of the plurality of second positioning cables, each of the second portion of the plurality of control modules controlling a second distance that the corresponding second positioning cable positions the second nozzle from the control module;
a first tower mounted on a selected one of the plurality of control modules and extending upwardly therefrom, a selected one of the plurality of first positioning cables being moveably attached to the first tower; and
a second tower mounted on the selected control module and extending upwardly therefrom, a selected one of the plurality of second positioning cables being moveably attached to the second tower, the selected control module being configured to control the first distance that the first positioning cable positions the first nozzle from the selected control module and the second distance that the second positioning cable positions the second nozzle from the selected control module.

2. The three-dimensional printing system of claim 1, further comprising:
a plurality of towers comprising the first tower, the plurality of first positioning cables each being moveably attached to a different corresponding one of the plurality of towers.

3. The three-dimensional printing system of claim 2, wherein each of the plurality of towers is telescoping.

4. The three-dimensional printing system of claim 2, wherein each of the plurality of towers comprises a pulley, and
the plurality of first positioning cables each extends from a corresponding one of the plurality of control modules around the pulley of the corresponding tower and to the first nozzle with the pulley of the corresponding tower positioning the first positioning cable above the corresponding control module.

5. The three-dimensional printing system of claim 4, further comprising:
a plurality of support cables each coupled to a different one of the plurality of towers; and
a pipe connected to the first nozzle and supplying the concrete mix thereto, the plurality of support cables supporting the pipe above the first nozzle.

6. The three-dimensional printing system of claim 5, further comprising:
a concrete pumping unit configured to pump the concrete mix into the pipe.

7. The three-dimensional printing system of claim 4, wherein the plurality of towers are each mounted on a different one of the plurality of control modules and extend upwardly therefrom.

8. The three-dimensional printing system of claim 2, wherein the plurality of towers are each mounted on a different one of the plurality of control modules and extend upwardly therefrom.

9. The three-dimensional printing system of claim 1, wherein
the plurality of first positioning cables comprises only three first positioning cables, and
the plurality of second positioning cables comprises only three second positioning cables.

10. A network of three-dimensional printing systems comprising:
a plurality of nozzles each configured to dispense a concrete mix, each of the plurality of nozzles being spaced apart from others of the plurality of nozzles;
a plurality of positioning cables, a different three of the plurality of positioning cables being attached to and positioning a corresponding different one of the plurality of nozzles; and
a plurality of control modules each configured to control a different pair of the plurality of positioning cables, a first positioning cable of the pair being attached to a first nozzle of the plurality of nozzles, a second positioning cable of the pair being attached to a second nozzle of the plurality of nozzles, the first nozzle being different from the second nozzle.

11. The network of three-dimensional printing systems of claim 10, further comprising:
first and second towers mounted on each of the plurality of control modules, the first and second positioning cables of the pair of positioning cables controlled by each of the plurality of control modules being moveably attached to the first and second towers, respectively, of the control module.

12. The network of three-dimensional printing systems of claim 11, wherein each of the first and second towers is telescoping.

13. The network of three-dimensional printing systems of claim 10, further comprising:
a plurality of pipes each connected to a different corresponding one of the plurality of nozzles and supplying the concrete mix thereto; and
a plurality of support cables supporting each of the plurality of pipes above the nozzle corresponding to the pipe.

14. A three-dimensional printing system comprising:
a first nozzle configured to dispense a concrete mix;
a second nozzle;
a first cable system comprising a plurality of first positioning cables connected to the first nozzle;
a second cable system comprising a plurality of second positioning cables connected to the second nozzle;
a control system comprising a plurality of control modules, each of a first portion of the plurality of control modules being connected to a different corresponding one of the plurality of first positioning cables, each of the first portion of the plurality of control modules controlling a first distance that the corresponding first positioning cable positions the first nozzle from the control module, each of a second portion of the plurality of control modules being connected to a different corresponding one of the plurality of second positioning cables, each of the second portion of the plurality of control modules controlling a second distance that the corresponding second positioning cable positions the second nozzle from the control module;
a first telescoping tower mounted on a selected one of the plurality of control modules and extending upwardly therefrom, a selected one of the plurality of first positioning cables being moveably attached to the first telescoping tower; and
a second telescoping tower mounted on the selected control module and extending upwardly therefrom, a selected one of the plurality of second positioning cables being moveably attached to the second telescoping tower, the selected control module being configured to control the first distance that the first positioning cable positions the first nozzle from the selected control module and the second distance that the second positioning cable positions the second nozzle from the selected control module.

15. The three-dimensional printing system of claim 14, further comprising:
a plurality of towers comprising the first telescoping tower, the plurality of first positioning cables each being moveably attached to a different corresponding one of the plurality of towers.

16. The three-dimensional printing system of claim 15, wherein each of the plurality of towers comprises a pulley, and
the plurality of first positioning cables each extends from a corresponding one of the plurality of control modules around the pulley of the corresponding tower and to the first nozzle with the pulley of the corresponding tower positioning the first positioning cable above the corresponding control module.

17. The three-dimensional printing system of claim 16, further comprising:
a plurality of support cables each coupled to a different one of the plurality of towers; and
a first pipe connected to the first nozzle and supplying the concrete mix thereto, a first portion of the plurality of support cables supporting the first pipe above the first nozzle; and
a second pipe connected to the second nozzle and supplying the concrete mix to the second nozzle which dispenses the concrete mix, a second portion of the plurality of support cables supporting the second pipe above the second nozzle.

18. The three-dimensional printing system of claim 17, further comprising:
a concrete pumping unit configured to pump the concrete mix into the first pipe.

19. The three-dimensional printing system of claim 15, wherein the plurality of towers are each mounted on a different one of the plurality of control modules and extend upwardly therefrom.

20. The three-dimensional printing system of claim 14, wherein
the plurality of first positioning cables comprises only three first positioning cables, and
the plurality of second positioning cables comprises only three second positioning cables.

* * * * *